(No Model.)

F. E. SOUTHARD & A. E. KLAUSER.
MANUFACTURE OF RUBBER TIRED WHEELS.

No. 420,609. Patented Feb. 4, 1890.

Attest:
L. G. Richardson
Wesley Royce

Inventor:
Frank E. Southard,
Arthur E. Klauser,
By Almon Hall, their Atty.

UNITED STATES PATENT OFFICE.

FRANK E. SOUTHARD AND ARTHUR E. KLAUSER, OF TOLEDO, OHIO.

MANUFACTURE OF RUBBER-TIRED WHEELS.

SPECIFICATION forming part of Letters Patent No. 420,609, dated February 4, 1890.

Application filed November 27, 1889. Serial No. 331,795. (No model.)

*To all whom it may concern:*

Be it known that we, FRANK E. SOUTHARD and ARTHUR E. KLAUSER, of Toledo, Lucas county, Ohio, have invented a new and useful Improvement in the Art of Manufacturing Vehicle-Wheels, of which the following is a specification.

Our invention relates to gutta-percha or india-rubber tires for velocipedes or other wheels, and more particularly to the method of forming and securing the same in place.

Rubber tires heretofore used on velocipede and other wheels have usually been put in place by stretching the vulcanized-rubber tire over the tire proper, where the rubber tire is retained by its own resiliency, or by the use of adhesives, or by bending the thin edges of the metal rim inwardly, so as to clamp the rubber tire. It is found that rubber tires which are thus stretched into place are objectionable for the following reasons: First, owing to the constant tension on the rubber, it wears more rapidly than it would if not stretched; second, any cut or abrasion of the stretched rubber tire tends by the constant pull on the rubber to widen and deepen such cut or abrasion, and, third, if the metal rim be not a true circle (a common occurrence in suspension-wheels) the rubber tire conforms to such irregularity.

The objects of our invention are to obviate the objections here pointed out and to provide a method of fastening rubber tires in place without stretching, pinching, or otherwise distorting the material, and to provide a wheel the finished periphery of which shall uniformly be a true circle. We attain these objects by the means hereinafter described, and illustrated in the accompanying drawings, made part hereof, in which—

Figure 1:
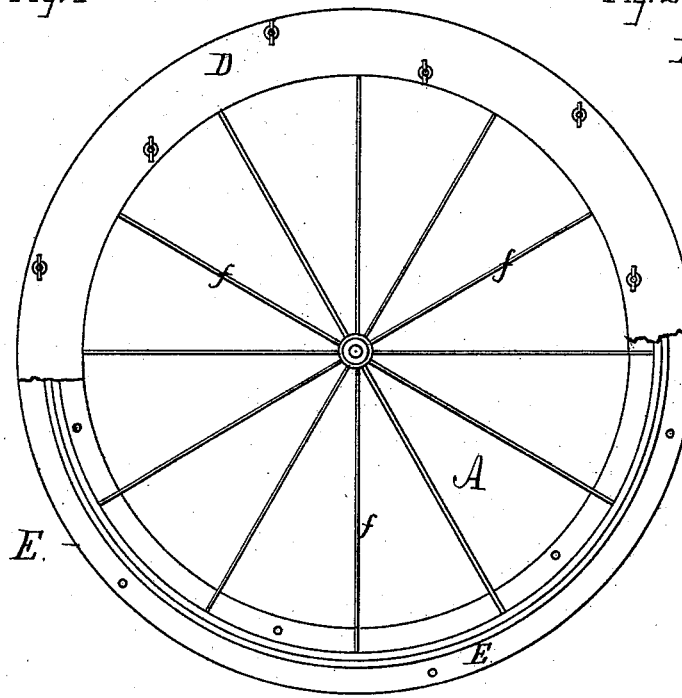
Figure 2:
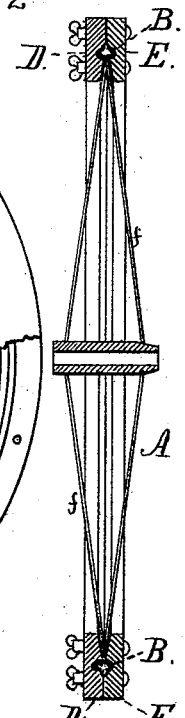
Figure 3:
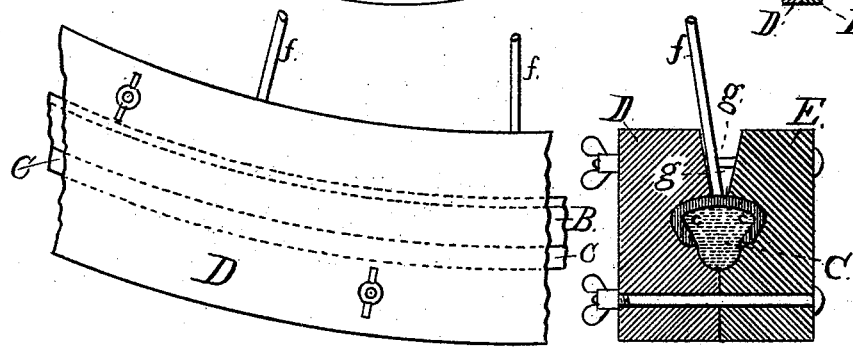
Figure 4:
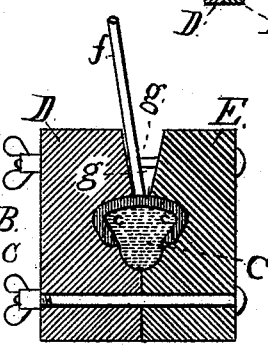

Figure 1 is a plan view of the mold or matrix in which our tire is compressed, given its finished shape, and vulcanized, with the wheel in place therein, a part of the upper plate of the mold being removed; Fig. 2, a diametrical cross-section of the same. Figs. 3 and 4 are enlarged portions of views shown in Figs. 1 and 2, and Fig. 5 is a cross-section of our metal rim.

Like letters of reference represent like parts throughout the drawings.

Wheel A is provided with metal rim B, (see Fig. 5,) having its edges turned inwardly, so that a flanged channel or recess $b$ is formed on the periphery of the rim throughout its circumference. The compounded rubber to be used in making the rubber tires while warm and in a doughy state is forced through a die to approximately the shape in cross-section of the completed rubber tire. (See Fig. 4.) The rubber comes from the die like a rope, from which lengths equal to the circumference of the wheel are cut off. These pieces C, still soft and warm, are placed around the rim, their ends united, and that part of the rubber rope $c$ corresponding to the flanged recess $b$ of rim B is pressed loosely into such recess. The wheel is now placed in a mold or matrix consisting of two metal plates D E, recessed in their adjoining faces to receive the rim B and tire C. The recesses in plates D E, when brought together, are in cross-section the shape of the exterior of rim B and the completed rubber tire, and are in plan a true circle. Plates D E have circular openings in their center designed to receive the hub and spokes of the wheel, and are cut away to leave space for the outer ends of the spokes $f$ where they enter the rim B, as shown at $g$, Fig. 4. The wheel, with its tire of soft, doughy, unvulcanized rubber, being placed between the two plates D E, these plates are brought and held closely together by clamps or other suitable means, and the rubber is thus forced into the recesses of the rim and of the mold, filling and conforming to them. The plates D E and rim B, with their recesses, now together form a flask within which the soft rubber may be vulcanized. The mold containing the wheel being subjected to a proper degree of heat for a suitable time, the rubber tire is vulcanized in place to the required degree of hardness and elasticity. The wheel is now removed from the mold with the rubber tire finished and complete and held firmly in place by the flanged metal rim without the rubber being either pinched, stretched, or otherwise disturbed, and with the outer periphery of the wheel in a true circle.

Figure 5:

In practice it is found desirable to have a few small apertures through rim B, as at $x$, Fig. 5, to permit escape of surplus rubber and to insure proper compression and neat work.

What we claim as our invention, and desire to secure by Letters Patent, is—

The art of making rubber-tired wheels, which consists in molding unvulcanized india-rubber upon a metal rim or tire provided with inwardly-projecting flanges adapted to receive and retain the india-rubber, and then vulcanizing the rubber tire in place, substantially as shown and described, for the purpose specified.

FRANK E. SOUTHARD.
ARTHUR E. KLAUSER.

Witnesses:
ALFRED JOHN BUCKWELL,
HUGH F. SHUNCK.